Patented June 6, 1933

1,913,276

UNITED STATES PATENT OFFICE

HENRY JAMES HODSMAN, OF HEADINGLEY, AND ALAN TAYLOR, OF HULL, ENGLAND, ASSIGNORS TO W. C. HOLMES AND COMPANY LIMITED, OF HUDDERSFIELD, ENGLAND, A BRITISH COMPANY

MANUFACTURE OF SULPHATE OF AMMONIA

No Drawing. Application filed May 26, 1931, Serial No. 540,210, and in Great Britain May 30, 1930.

This invention relates to the manufacture of sulphate of ammonia.

In methods at present employed for recovering ammonia as sulphate from coal gas and other gases, difficulties are met with owing to the high cost of the sulphuric acid and steam required. Moreover, at times the disposal of effluents produced in the manufacture presents difficulty.

Numerous proposals have been put forward for the manufacture of sulphate of ammonia by combining sulphur dioxide with ammonia and subsequently oxidizing the aqueous solution of ammonium sulphite. It has also been suggested to pass sulphur dioxide or gas containing it into the liquid in a saturator or absorbing vessel, at the same time subjecting the liquid to electrolysis, thus taking advantage of the known fact that sulphuric acid is formed when sulphur dioxide is passed into a bath in which electrolysis of an acid or salt is proceeding.

One object of the present invention is to enable ammonium sulphite to be oxidized to sulphate of ammonia in an economical and expeditious manner. A further object is to facilitate the oxidization of aqueous solutions of ammonium sulphate containing a substantial proportion of sulphate of ammonia.

The oxidization of an aqueous solution of ammonium sulphite can readily be effected to a substantial extent by means of air or other oxygen-containing gases but the completion of the oxidation, especially in the presence of a substantial concentration of sulphate of ammonia, is more difficult. Oxidation of such aqueous solutions electrolytically is more expensive but it has been found that the reaction will go to completion more readily especially if a soluble chloride, such as ammonium chloride is present in the solution.

By the present invention therefore sulphate of ammonia may be manufactured expeditiously and economically by bringing an aqueous solution containing ammonium sulphite into contact with an oxidizing gas so as partly to oxidize the ammonium sulphite, and then completing the oxidation electrolytically so as to produce a solution of sulphate of ammonia.

In carrying out the invention, crude ammonia liquor may be combined with sulphur dioxide which may be supplied in excess. This sulphur dioxide may be obtained by burning sulphur, or materials containing sulphur, by known methods, or may be wholly or in part derived from the flue gases of steam boilers or other furnaces when these gases contain sulphur dioxide.

Oxidation of the resulting ammonium sulphite liquor is then commenced by the action of hot gases containing free oxygen, and for this purpose the sulphite liquor may be allowed to pass down a suitably packed tower or through an equivalent plant where it is subjected to a current of hot oxygen-containing gases, such as products of combustion containing free oxygen. In this way oxidation of the sulphite takes place and the bulk of the liquor is reduced by evaporation, whilst the phenols, if present, are largely driven off. As the liquor becomes more and more concentrated the rate of oxidation decreases, but it is possible for the sulphite to be about half converted to sulphate, while the volume of liquor may at the same time be reduced to a fraction of its original volume.

The completion of the oxidation of the ammonium sulphite liquor is then effected in an electrolytic cell, and the efficiency of this operation is increased by the ammonium chloride already present in the liquor, whilst if necessary, a soluble chloride may be added. The electrolysis is arrested before the thiocyanate or thiosulphate, if present, is oxidized. The oxidized liquor may now be evaporated by known methods to obtain a commercial crystallized salt of ammonia, consisting mainly of sulphate with some chloride. The mother liquor, containing thiocyanate and thiosulphate of ammonia, can be disposed of by known methods.

The chlorine ion of the soluble chloride appears to possess the function, in the electrolysis, of an oxygen carrier.

Instead of employing crude ammonia liquor, the ammonia may be obtained in the usual way by distilling such liquor with lime, or it may be obtained from other sources, e. g. synthetic processes.

The oxidation of the ammonium sulphite by the action of the oxygen-containing gases may be accelerated by the employment of an effective catalyst. Heavy metal salts appear to act as catalysts under suitable conditions of acidity or alkalinity. Manganous salts, cuprous chloride, cobalt salts such as cobalt chloride, or iron salts preferably in the ferrous state may be employed under appropriate conditions. It is, therefore, necessary to determine the degree of acidity or alkalinity of the solutions at which the catalysts are most effective since any substantial variation from the optimum conditions may reduce or nullify entirely the catalytic influence of the heavy metal compound.

Generally speaking the conditions must at least ensure that the catalyst is maintained entirely in solution. When employing cobalt salts as catalysts the solution must also be kept definitely alkaline until the completion of the oxidation. An alkalinity corresponding to a pH value of at least 8 appears to be necessary.

Cobalt salts appear less desirable for use as catalysts than iron salts for several reasons. In the first place difficulties have been encountered in securing complete oxidation with the aid of cobalt salts in presence of high concentrations of sulphate of ammonia. When sulphate of ammonia is to be recovered from the aqueous solutions, it is necessary to oxidize the ammonium sulphite in presence of a high concentration of sulphate of ammonia, e. g. up to 400 grams per litre of solution, in order to minimize any subsequent evaporation operation which may have to be performed.

Again the essential condition of alkalinity appears to preclude the possibility of employing cobalt salts where the ammonia is treated with excess of sulphur dioxide as such solutions must possess an acid reaction. A slightly acid reaction during the oxidation by gas is advantageous in avoiding loss of ammonia. If this is carried away by the oxidizing gases it may be necessary to recover it by absorption or by leading the escaping gases into contact with uncombined sulphur dioxide.

The preferred catalysts to employ consist of ferrous salts which may be added to the liquors as such, e. g. in the form of ferrous sulphate, or introduced by bringing the liquors into contact with metallic iron, e. g. the internal surfaces of the apparatus. Iron salts appear to be effective only in distinctly acid solutions, that is to say solutions in which the pH value does not exceed about 6. It is to be noted, however, that the behaviour of the iron is influenced by temperature. About 50° C. appears to be the maximum permissible temperature to which solutions containing ammonium sulphite and iron salts should be exposed. It is preferred, however, to maintain the temperature of such solutions below about 40° C. since at these lower temperatures the solutions are relatively stable even with slight variations in acidity. At temperatures of the order of 50° C. and upwards precipitation of the iron occurs somewhat too readily if the pH value of the solution rises, even momentarily, above about 6. It is not satisfactory to attempt to remedy this by increasing the acidity as loss of sulphur dioxide may then result.

It will be seen that with the method of manufacturing sulphate of ammonia according to the present invention, a supply of sulphuric acid as such is not necessary to fix the ammonia, and that the sulphur present in the coal from which the ammonia is derived may be utilized for the purpose, either by burning the spent oxide purifying material or by utilizing the sulphur dioxide arising from the combustion of the coal or the coke produced therefrom. Moreover, it is unnecessary to supply any acid to fix that part of the ammonia present in crude gas liquor as chloride. Further, it will be seen that "waste heat" may be used for evaporating the liquid in the first stage of oxidation, and that the production of effluent will be eliminated or reduced to a minimum.

The solutions after oxidation may be subjected to any suitable process of crystallization for the production of solid sulphate of ammonia. If they contain iron or other catalyst they may be treated in any suitable way for the removal of this prior to crystallization.

By way of example we may say that in carrying out the electrolytic oxidation a very high degree of efficiency has been obtained with a current density of about 2 amps. per square decimetre. The voltage need only be quite low. Thus successful results have been obtained with a voltage of 0.35 volts and a current density of 0.6 amps. per square decimetre.

We declare that what we claim is:—

1. Process for the manufacture of sulphate of ammonia which consists in bringing an aqueous solution containing ammonium sulphite into contact with an oxidizing gas and thereby oxidizing a part of said ammonium sulphite and then subjecting said solution to electrolysis and thereby oxidizing the remainder of said ammonium sulphite.

2. Process for the manufacture of sulphate of ammonia which consists in bringing an aqueous solution containing ammonium sulphite and a heavy metal compound acting as an oxidizing catalyst into contact with an oxidizing gas and thereby oxidizing a part of said ammonium sulphite and then subjecting said solution to electrolysis and thereby oxidizing the remainder of said ammonium sulphite.

3. Process as claimed in claim 1 in which the oxidizing gas consists of hot products of combustion containing free oxygen.

4. Process as claimed in claim 1 in which the oxidizing gas consists of air.

5. Process for the manufacture of sulphate of ammonia which consists in causing an aqueous solution containing ammonium sulphite to flow down a packed tower in contact with hot gases containing free oxygen and thereby oxidizing a part of said ammonium sulphite and then subjecting said solution to electrolysis and thereby oxidizing the remainder of said ammonium sulphite.

6. Process for the manufacture of sulphate of ammonia which consists in combining ammonia and sulphur dioxide in aqueous solution, bringing said aqueous solution into contact with a gas containing free oxygen and thereby oxidizing a part of the ammonium sulphite and then subjecting said solution to electrolysis and thereby oxidizing the remainder of said ammonium sulphite.

7. Process for the manufacture of sulphate of ammonia which consists in absorbing sulphur dioxide in crude ammonia liquor, bringing the aqueous solution containing ammonium sulphite thus formed into contact with a gas containing free oxygen and thereby oxidizing a part of the ammonium sulphite and then subjecting said aqueous solution to electrolysis and thereby oxidizing the remainder of said ammonium sulphite.

8. Process for the manufacture of sulphate of ammonia as claimed in claim 7 in which the gas containing free oxygen consists of air.

9. Process for the manufacture of sulphate of ammonia as claimed in claim 7 in which the gas containing free oxygen consists of hot products of combustion.

10. Process for the manufacture of sulphate of ammonia which consists in bringing an aqueous solution containing ammonium sulphite and ammonium chloride into contact with an oxidizing gas and thereby oxidizing a part of said ammonium sulphite and then subjecting said solution to electrolysis and thereby oxidizing the remainder of said ammonium sulphite.

11. Process for oxidizing aqueous solutions containing ammonium sulphite by electrolysis in which said aqueous solutions contain ammonium chloride.

12. Process for the production of sulphate of ammonia which consists in electrolyzing an aqueous solution containing sulphate of ammonia, ammonium sulphite and ammonium chloride.

13. Process for the oxidation of ammonium sulphite in aqueous solution and in presence of a high concentration of sulphate of ammonia which consists in subjecting said solution to electrolysis in presence of ammonium chloride.

14. Process for the manufacture of sulphate of ammonia which consists in bringing an aqueous solution containing ammonium sulphite and a soluble chloride into contact with an oxidizing gas and thereby oxidizing a part of said ammonium sulphite and then subjecting said solution to electrolysis and thereby oxidizing the remainder of said ammonium sulphite.

15. Process for the production of sulphate of ammonia which consists in electrolyzing an aqueous solution containing sulphate of ammonia, ammonium sulphite and a soluble chloride.

In witness whereof, we have hereunto signed our names this 13th day of May, 1931.

HENRY J. HODSMAN.
ALAN TAYLOR.